US008171481B2

(12) United States Patent
Benedetti et al.

(10) Patent No.: US 8,171,481 B2
(45) Date of Patent: May 1, 2012

(54) METHOD AND SYSTEM FOR SCHEDULING JOBS BASED ON RESOURCE RELATIONSHIPS

(75) Inventors: Fabio Benedetti, Rome (IT); Jonathan Wagner, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 1332 days.

(21) Appl. No.: 11/289,107

(22) Filed: Nov. 29, 2005

(65) Prior Publication Data

US 2006/0080666 A1    Apr. 13, 2006

(30) Foreign Application Priority Data

Feb. 12, 2004   (EP) ..................... 04106232

(51) Int. Cl.
*G06F 9/46* (2006.01)
(52) U.S. Cl. ...................................... 718/104
(58) Field of Classification Search .................. 718/104
See application file for complete search history.

(56) References Cited

U.S. PATENT DOCUMENTS

| | | | |
|---|---|---|---|
| 6,766,348 B1 * | 7/2004 | Combs et al. | 718/104 |
| 6,901,446 B2 * | 5/2005 | Chellis et al. | 709/226 |
| 7,577,722 B1 * | 8/2009 | Khandekar et al. | 709/220 |
| 2002/0171678 A1 * | 11/2002 | Bandhole et al. | 345/744 |
| 2003/0041088 A1 * | 2/2003 | Wilson et al. | 709/104 |
| 2004/0226015 A1 * | 11/2004 | Leonard et al. | 718/100 |

* cited by examiner

*Primary Examiner* — Jennifer To
*Assistant Examiner* — Brian Chew
(74) *Attorney, Agent, or Firm* — Garg Law Firm, PLLC; Rakesh Garg; Jeffrey S. LaBaw (57) ABSTRACT

The present invention proposes a scheduler, which is used to submit execution of jobs according to a predefined plan. Each job is defined by a corresponding descriptor. The descriptor specifies the resources to be used by the jobs (through their properties). In addition, for each resource the descriptor can also specify one or more relationships with other resources (defined by their properties as well). When the job must be submitted, the scheduler identifies the actual resources that possess the desired properties and that satisfy the desired relationships. For this purpose, the scheduler accesses a repository with stores information about the available resources and their relationships.

11 Claims, 9 Drawing Sheets

METHOD AND SYSTEM FOR SCHEDULING JOBS BASED ON RESOURCE RELATIONSHIPS

TECHNICAL FIELD

The present invention relates to the data processing field. More specifically, the present invention relates to the scheduling of work units in a data processing system.

BACKGROUND ART

Scheduling methods are commonly used in a data processing system for controlling the execution of different work units (for example, jobs in a batch processing). For this purpose, several types of schedulers have been proposed in the last years to automate the process of submitting the execution of large quantities of jobs. The schedulers submit the jobs according to a predefined plan. The plan establishes a flow of execution of the jobs according to several factors; typically, the factors affecting the flow of execution include temporal constraints (such as date, time, day of the week) and dependencies (such as completion of preceding jobs). An example of scheduler is the "Tivoli Workload Scheduler" by IBM Corporation.

Each job typically requires several hardware and/or software resources for its execution (such as computers, operating systems, applications, databases, storage devices, and the like). The resources that must be used by the job can be specified statically (i.e., identifying the actual physical or logical entities). However, most of the available schedulers allow defining the required resources through their properties; for example, it is possible to specify that the job must be executed on a computer having a desired operating system, number of processors, installed memory, and so on. In this way, the actual physical or logical entities to be used by the job can be selected dynamically at run-time.

Nevertheless, the solutions known in the art are ineffective in dealing with complex environments composed of many types of resources (such as networks, clusters, organizations, and the like). Particularly, the available schedulers lack any support for managing physical or logical relationships among the resources to be used by the jobs; a typical example is that of a system with a multitude of computers that are connected to each other, manage applications running on other computers, access remote databases, and the like.

The above-mentioned drawbacks seriously hinder the use of the schedulers in many practical situations; particularly, this makes it very difficult to control the submission of jobs in distributed environments (for example, based on the Internet).

SUMMARY OF THE INVENTION

According to the present invention, the idea of managing relationships among the resources is suggested.

Particularly, an aspect of the present invention provides a method for scheduling execution of work units in a data processing system. The system includes a plurality of resources; one or more relationships are established among the resources. The method includes the following steps for one or more work units. The method starts by providing a definition of the work unit. The definition includes an indication of one or more formal resources that are required by the work unit; each formal resource indicates one or more properties of the formal resource, and one or more formal relationships with at least another formal resource. Each formal resource is then resolved into one or more resources (which possess the properties and satisfy the formal relationships indicated in the formal resource). The work unit can now be submitted on a selected one of the resources corresponding to each formal resource.

In this way, it is possible to control the submission of work units that are conditioned on relationships among different resources.

In any case, this result is achieved selecting the resources required by the work units dynamically at run-time.

The above-mentioned advantages are clearly perceived in complex environments; particularly, this fosters the application of the available scheduling techniques in distributed systems (for example, based on the Internet).

The different embodiments of the invention described in the following provide additional advantages.

For example, the formal resources are resolved using a memory structure that stores the properties of the available resources and their relationships.

The proposed implementation is very simple and effective.

As a further enhancement, the resources are grouped into different types.

In this way, the definition of the formal resources is strongly simplified.

Advantageously, the relationships belong to predefined categories.

Therefore, any kind of physical and/or logical relationship can be modeled.

A suggested choice for the definition of each relationship is of specifying a source resource and a target resource.

This model provides a good compromise between the opposed requirements of flexibility and simplicity.

In a preferred embodiment of the invention, the resolution of the formal resources involves identifying a set of eligible resources possessing the desired properties, which set is then reduced according to the formal relationships.

The proposed algorithm provides good performance (since the operation of identifying the eligible resources is typically very fast).

Advantageously, the reduction of the eligible resources starts with the operation of identifying eligible relationships that belong to the category of each corresponding formal relationship; a loop is then reiterated until all the eligible relationships that cannot be satisfied by the available eligible resources have been removed.

This algorithm converges to the desired result in a very effective way.

A further aspect of the present invention provides a computer program for performing the above-described method.

A still further aspect of the invention provides a program product embodying this computer program.

Another aspect of the invention provides a corresponding data processing system.

The characterizing features of the present invention are set forth in the appended claims. The invention itself, however, as well as further features and advantages thereof will be best understood by reference to the following detailed description, given purely by way of a nonrestrictive indication, to be read in conjunction with the accompanying drawings.

DETAILED DESCRIPTION OF THE PREFERRED EMBODIMENT(S)

Figure 1A:
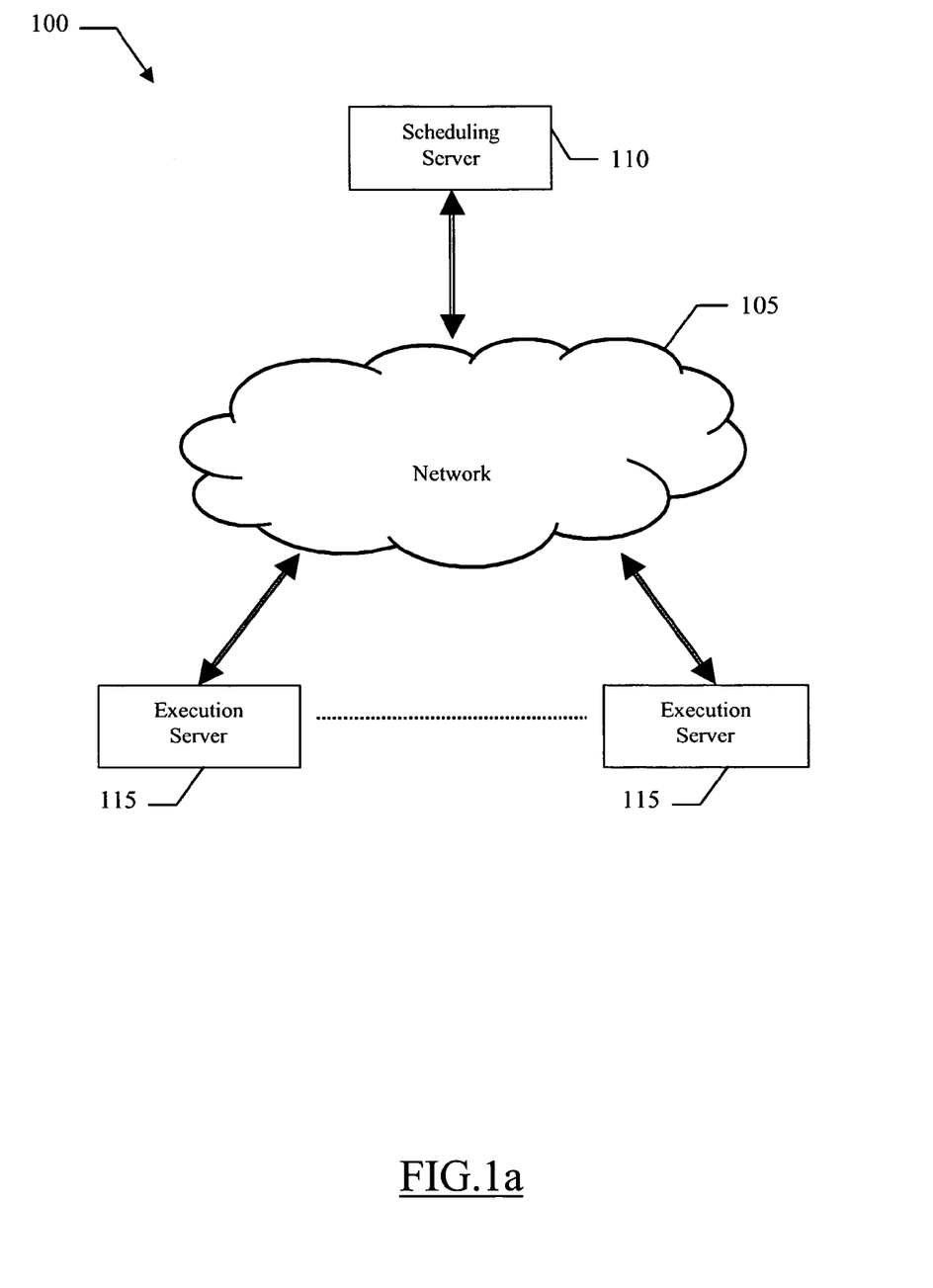
FIG. 1a is a schematic block diagram of a data processing system in which the method according to an embodiment of the invention is applicable.

With reference in particular to FIG. 1a, a schematic block diagram of a data processing system 100 (in which the method according to an embodiment of the invention can be applied) is illustrated. The system 100 has a distributed architecture based on a network 105 (typically consisting of the Internet). Particularly, a central scheduling server 110 is used to submit the execution of non-interactive jobs (for example, payroll programs, cost analysis applications, and the like). The scheduling server 110 interacts with multiple servers 115, which control the actual execution of the jobs. The scheduling server 110 and the execution servers 115 communicate through the network 105.

Figure 1B:
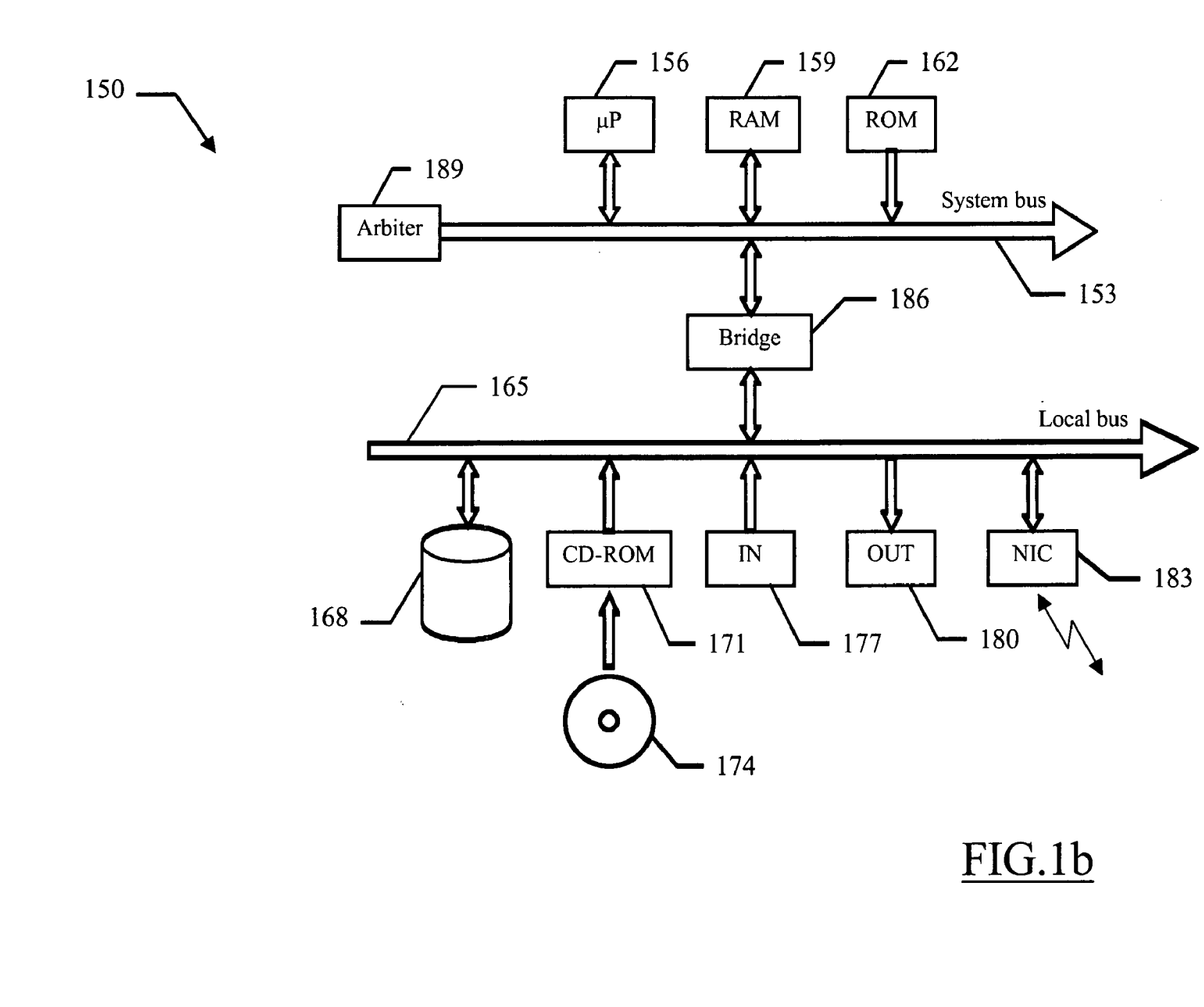
FIG. 1b shows the functional blocks of a generic computer of the system.

As shown in FIG. 1b, a generic computer of the system (scheduling server or execution server) is denoted with 150. The computer 150 is formed by several units that are connected in parallel to a system bus 153. In detail, one or more microprocessors (μP) 156 control operation of the computer 150; a RAM 159 is directly used as a working memory by the microprocessors 156, and a ROM 162 stores basic code for a bootstrap of the computer 150. Peripheral units are clustered around a local bus 165 (by means of respective interfaces). Particularly, a mass memory consists of a hard disk 168 and a drive 171 for reading CD-ROMs 174. Moreover, the computer 150 includes input devices 177 (for example, a keyboard and a mouse), and output devices 180 (for example, a monitor and a printer). A Network Interface Card (NIC) 183 is used to connect the computer 150 to the network. A bridge unit 186 interfaces the system bus 153 with the local bus 165. Each microprocessor 156 and the bridge unit 186 can operate as master agents requesting an access to the system bus 153 for transmitting information. An arbiter 189 manages the granting of the access with mutual exclusion to the system bus 153.

Figure 2A:
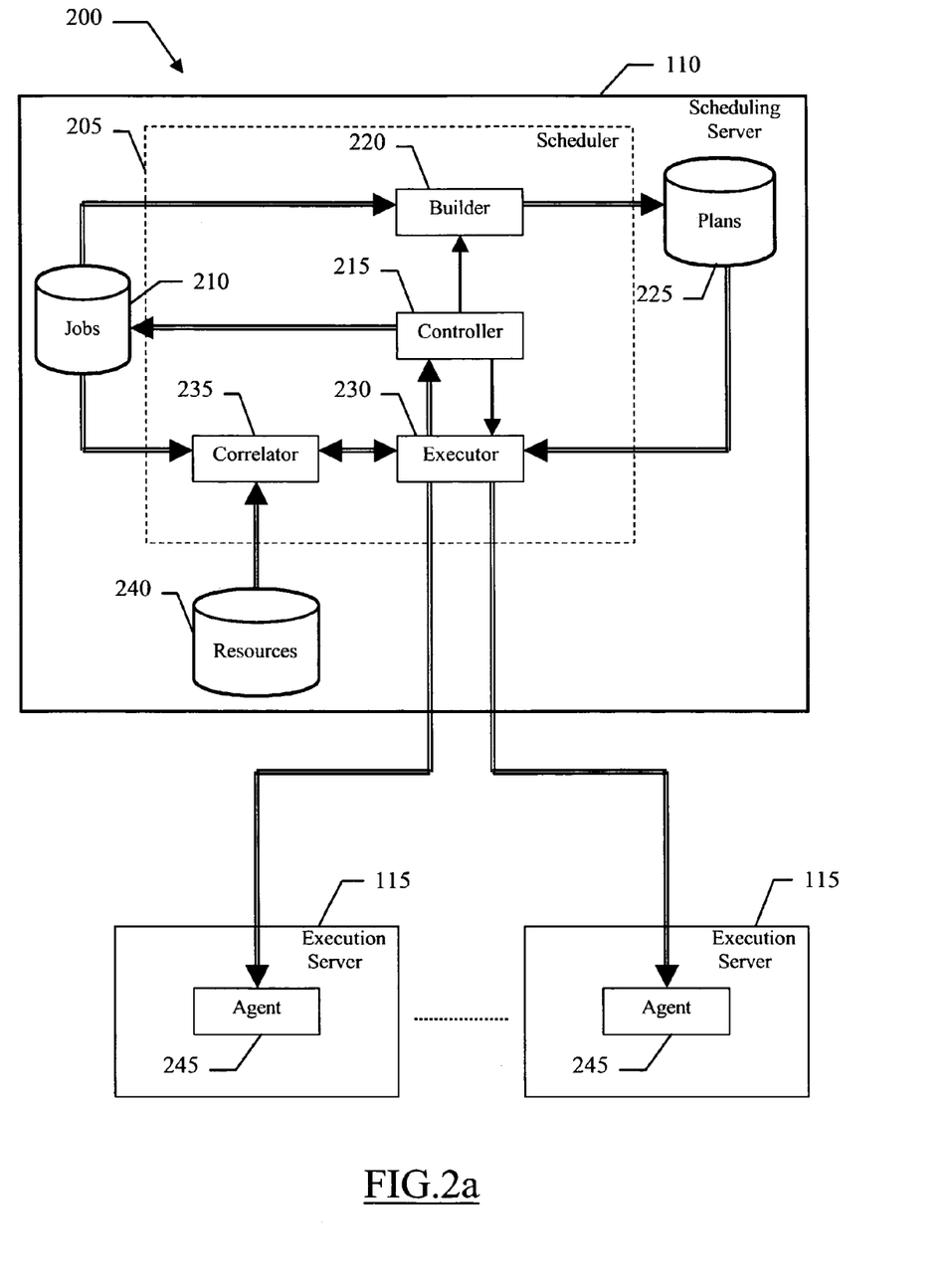
FIG. 2a depicts the main software components that can be used for practicing the method according to an embodiment of the invention.

Moving now to FIG. 2a, the main software components that can be used for practicing the method according to an embodiment of the invention are denoted as a whole with the reference 200. The information (programs and data) is typically stored on the hard disks and loaded (at least partially) into the corresponding working memories when the programs are running. The programs are initially installed onto the hard disks from CD-ROMs.

Particularly, a scheduler 205 runs on the corresponding server 110. The scheduler 205 is used to automate the submission of desired jobs in the above-described system. The jobs are defined in a workload database 210. For this purpose, the workload database 210 includes a descriptor for each job (written in a suitable control language, for example, XML-based).

The descriptor of the job starts with an execution specification section, which provides information about the execution of the job; for example, the execution specification section indicates the programs to be invoked, their arguments and environmental variables, a planned time of execution, an estimated duration, and any dependency from other jobs. The descriptor of the job further includes a resource specification section, which provides information about the (hardware and/or software) resources to be used by the job. The resources can consist of any physical or logical entities (for example, networks, clusters, organizations, computers, operating systems, applications, databases, storage devices, and the like). The resources required by the job must have specific characteristics. Particularly, the characteristics of each resource include desired properties (such as a computer having a specific operating system, number of processors, amount of memory, and so on); the characteristics of the resource can also include relationships with other resources (such as a computer managing an application running on another computer, an application accessing a remote database, and so on).

As described in detail in the following, each resource required by the job is indicated in the descriptor by means of a formal definition based on its characteristics. More specifically, the characteristics of the formal resource consist of the properties that it must possess; in addition, the characteristics of the formal resource can also include the specification of relationships with other resources that it must satisfy; those relationships are in turn indicated by means of a formal definition based on the characteristics of the other resources. For example, the formal resource can indicate that the job must be submitted on a computer having a specific operating system and managing another computer that runs a specific application.

The scheduler 205 includes a controller 215, which transmits information about the jobs to be executed to a builder 220. The builder 220 creates one or more plans for controlling a flow of execution of batches of jobs in a desired sequence (for example, covering a period of 24 hours). Each plan is built according to the temporal constraints and the dependencies of the jobs, as defined in their descriptors extracted from the workload database 210. The builder 220 stores the definition of the plans so obtained into a corresponding repository 225.

The controller 215 requires the execution of a selected plan to an executor 230. For this purpose, the executor 230 extracts the definition of the current plan from the repository 225. The executor 230 also interfaces with a correlator 235; for each job of the plan, the correlator 235 resolves each formal resource required by the job (as defined in its descriptor extracted from the workload database 210) into one or more (concrete) resources, which possess the desired properties and satisfy the desired (concrete) relationships. For this purpose, the correlator 235 accesses a resource repository 240; the resource repository 240 stores information about the concrete resources of the system (with their properties) and about the concrete relationships among these concrete resources.

The information so obtained (indicating the actual concrete resources to be used by the jobs of the plan, and especially their execution servers 115) is accordingly used by the executor 230 to submit each job. Particularly, the executor 230 interfaces with an agent 245 running in the background on each execution server 115; the agent 245 controls the execution of the jobs in response to corresponding requests received from the executor 240 and returns feedback information relating to the result of the execution. This information is passed by the executor 230 to the controller 215, which updates the corresponding descriptors of the jobs in the workload database 210 accordingly (for example, changing the expected duration of each job that has just completed as a function of its last duration).

Figure 2B:
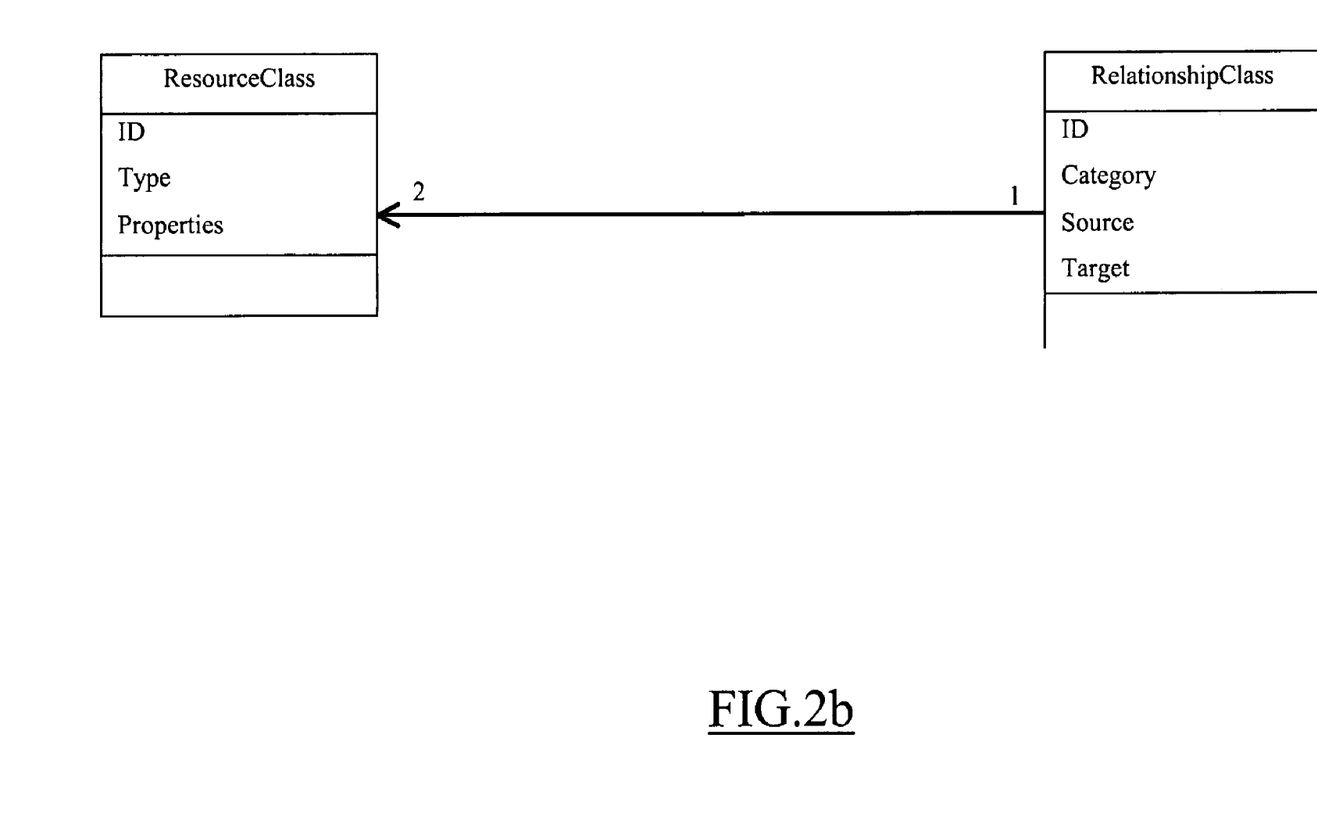
FIG. 2b is a class diagram of a resource repository that can be used in the system according to an embodiment of the invention.
Figure 3A:
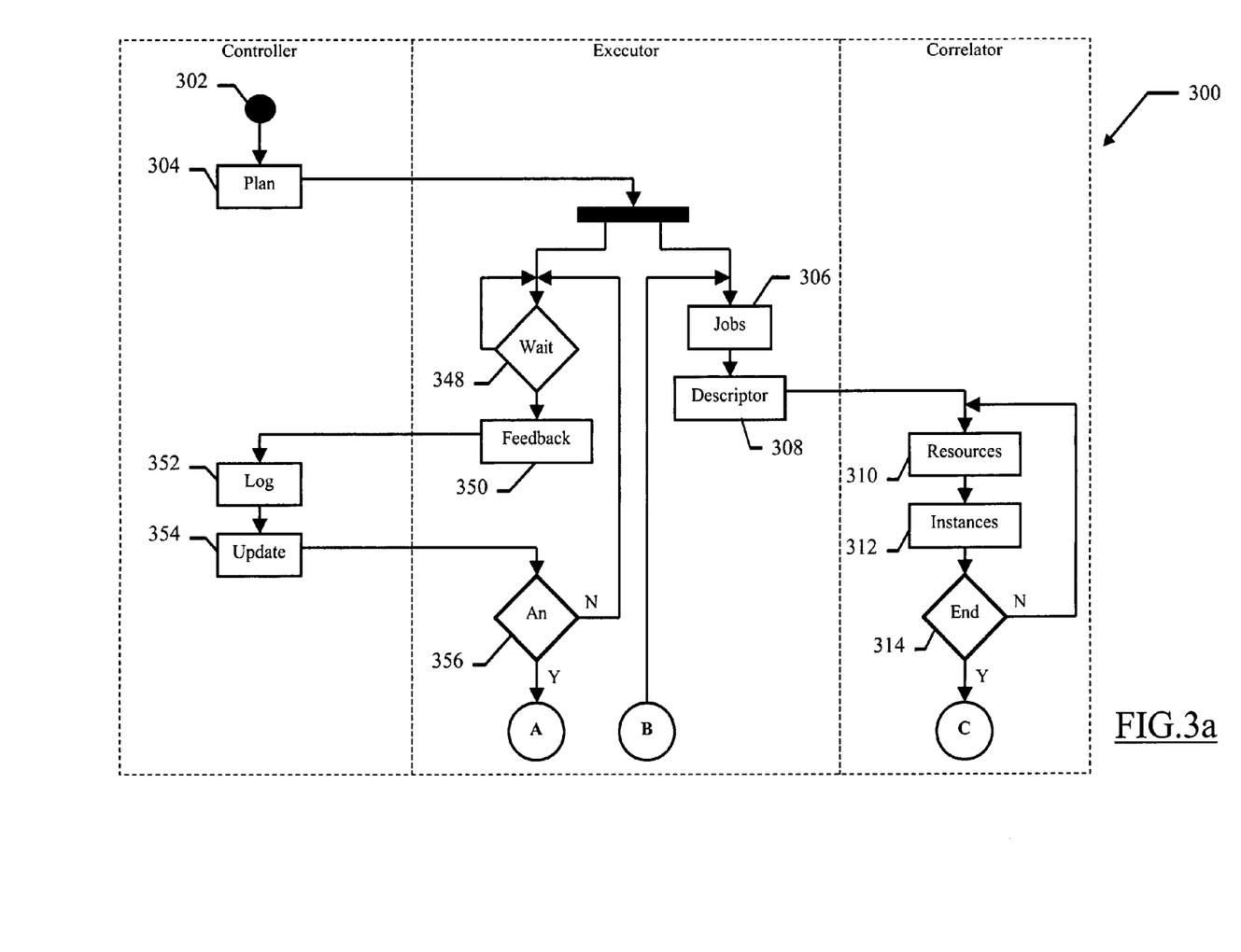
FIGS. 3a-3d show a diagram describing the flow of activities relating to an illustrative implementation of the method according to an embodiment of the invention.
Figure 3B:
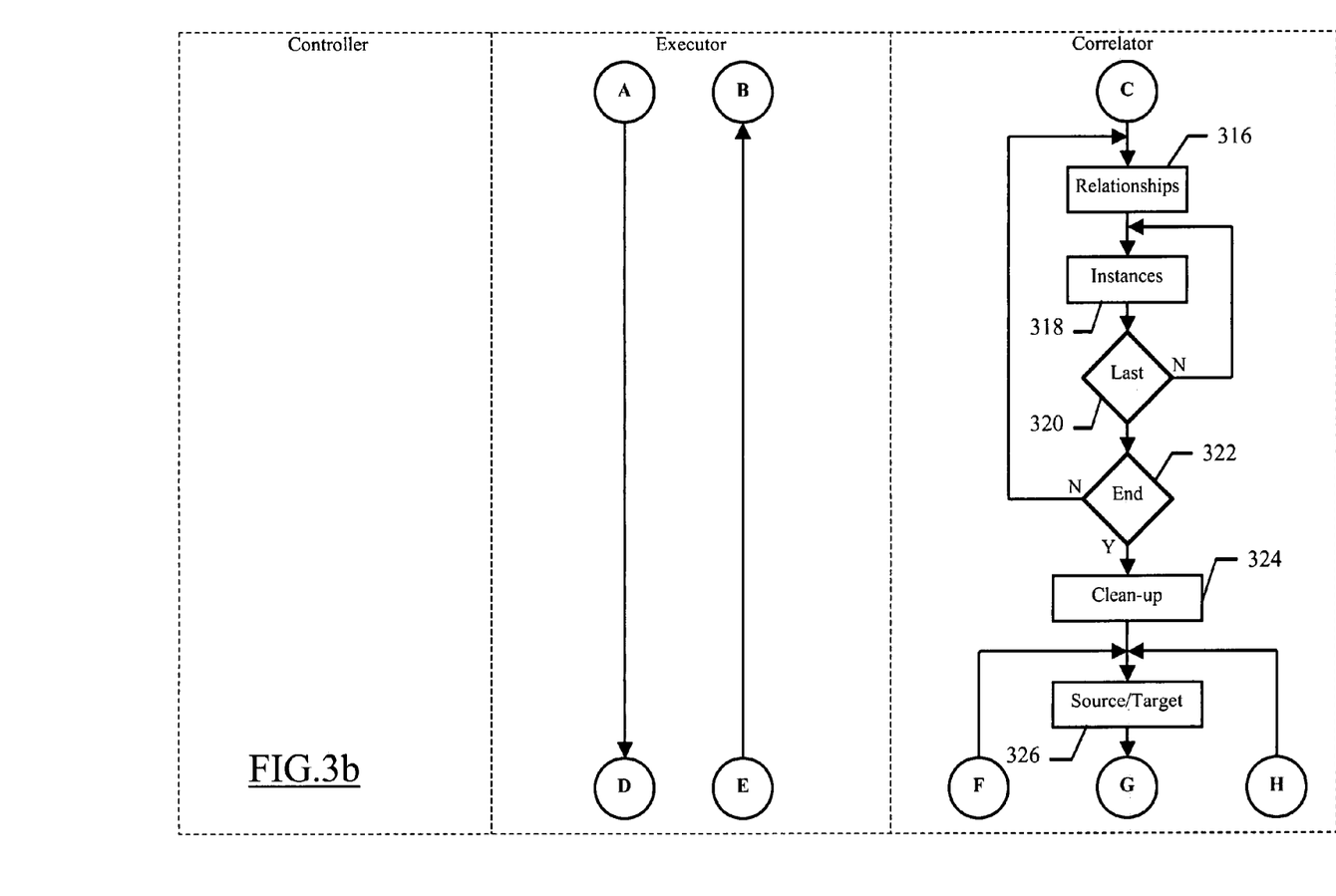
Figure 3C:
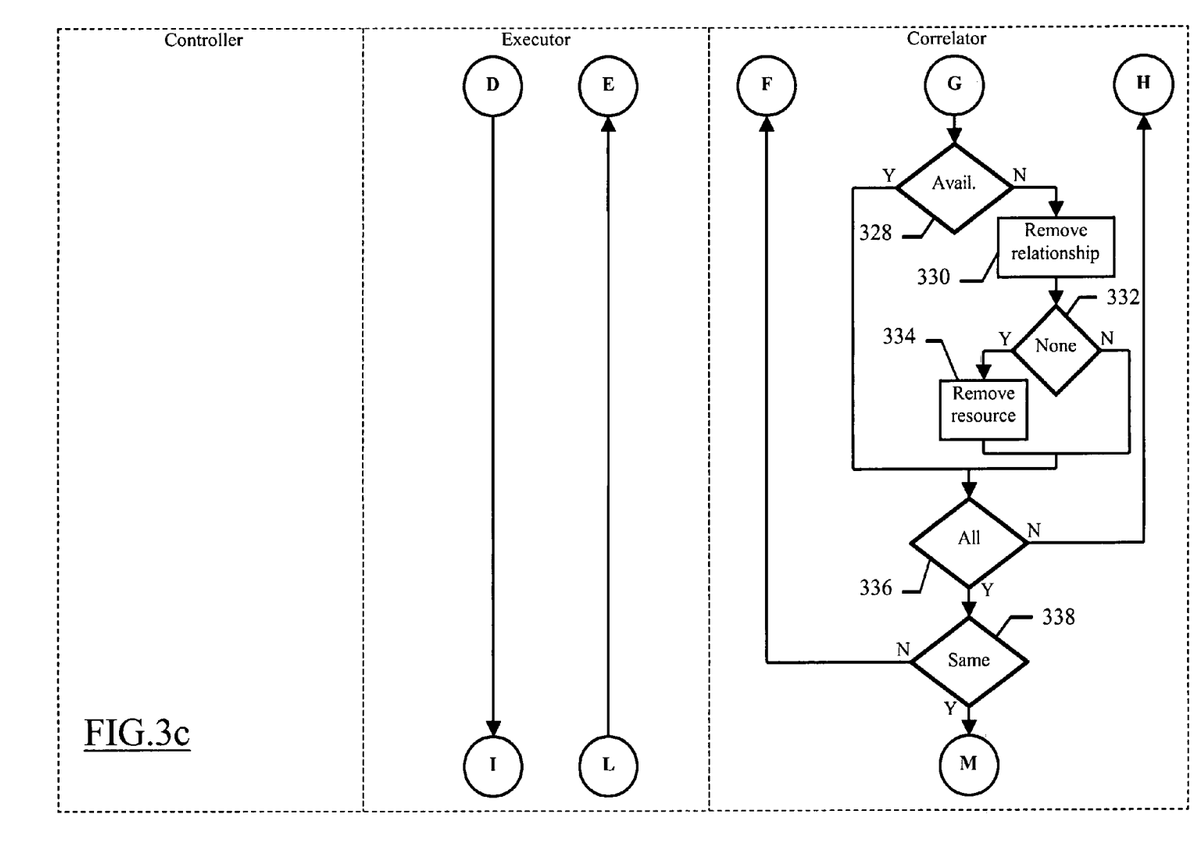
Figure 3D:
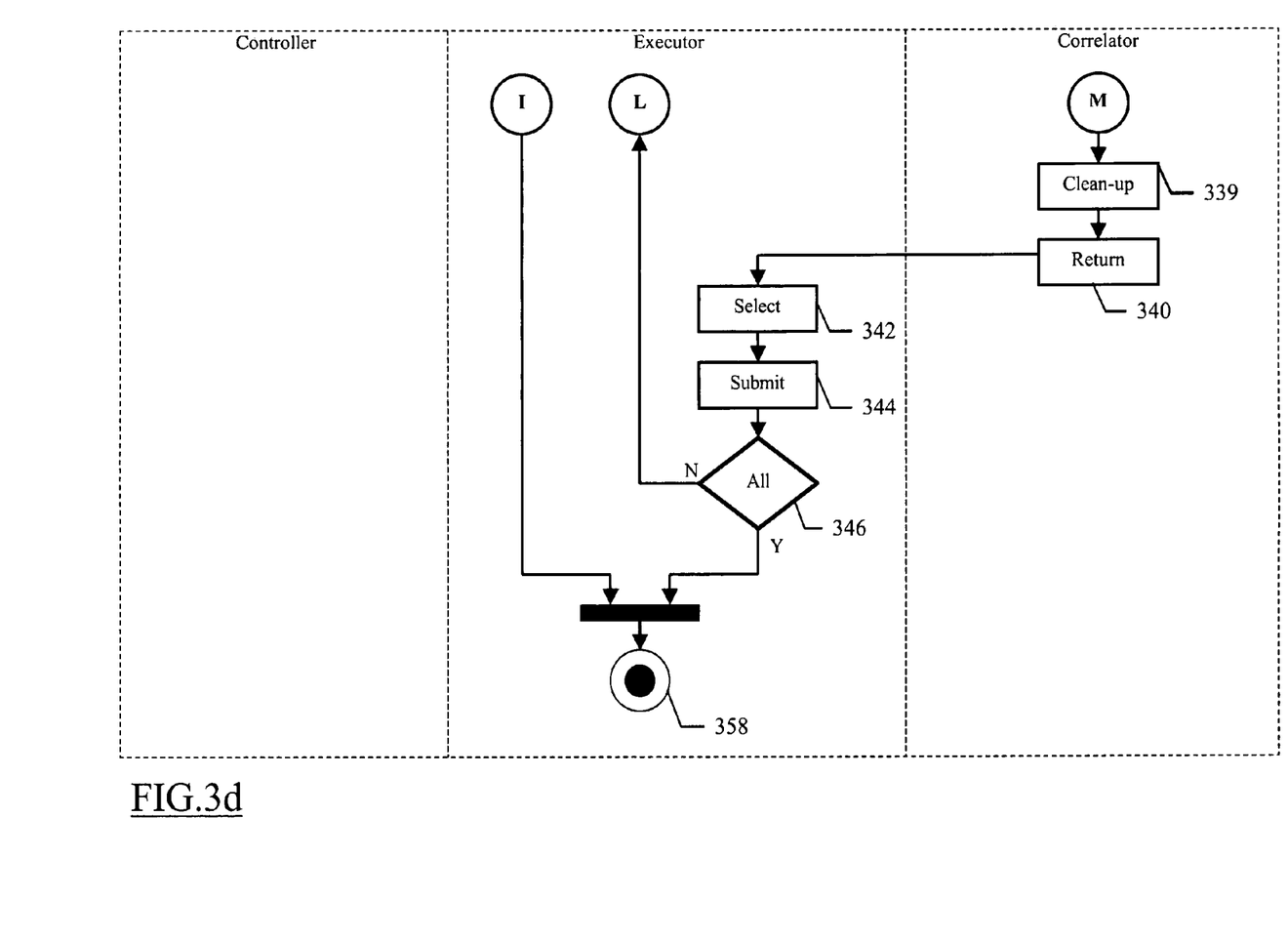

As shown in the class diagram of FIG. 2b, the concrete resources and the concrete relationships are preferably represented in the corresponding repository with an object-oriented model. For example, the concrete resources are defined by a class "ResourceClass". The class "ResourceClass" has an attribute "ID", which uniquely identifies each instance of the class "ResourceClass" (representing an actual physical/logical entity). Another attribute "Type" is used to partition the concrete resources into different groups (for example, networks, computers, applications, databases, and the like). The (other) properties of the concrete resource are specified in corresponding attributes (collectively denoted as "Properties"). On the other hand, the concrete relationships are defined by a class "RelationshipClass", which is associated to the class "ResourceClass" with a cardinality 1-2. The class "RelationshipClass" likewise has an attribute "ID" that uniquely identifies each instance of the class "RelationshipClass" (representing an actual relationship between two physical/logical entities). Another attribute "Category" is used to indicate a specific correlation between a concrete resource specified by an attribute "Source" and another concrete resource specified by an attribute "Target" (for example, a computer belonging to a network, a computer managing an application, an application accessing a database, and the like).

Considering now FIGS. 3a-3d, the logic flow of a scheduling process according to an embodiment of the invention implements a method 300. The method begins at the black start circle 302 in the swimlane of the controller. Continuing to block 304, a desired plan is submitted to the executor.

Moving now to the swimlane of the executor, the flow of activities includes two branches that are performed concurrently. A first branch consists of blocks 306-346, and a second branch consists of blocks 348-356; the two branches joint at the concentric white/black stop circles 358.

Considering in particular the branch 306-346, the jobs that are available for running are identified at block 306 (according to their planned time of execution and their dependencies). For each available job, the executor at block 308 retrieves the corresponding descriptor from the workload database; the resource specification section of the descriptor is then passed to the correlator.

In response thereto, the correlator at block 310 parses the received information. Whenever the definition of a formal resource to be used by the job is encountered, the correlator at block 312 identifies the (eligible) concrete resources that possess the required properties (disregarding any formal relationships for the time being); for this purpose, the correlator extracts (from the resource repository) all the objects instantiating the class "ResourceClass" of the type of the formal resource (indicated in the attribute "Type") and that possess the desired other properties (indicated in the attribute "Properties"). The method then verifies at block 314 whether the parsing has been completed (i.e., all the formal resources have been processed or the definition of the job does not include any formal resource). If not, the flow of activity returns to block 310 for repeating the operations described above on a next formal resource.

Conversely, the method descends into block 316 wherein each formal resource (starting from the first one) is analyzed again; particularly, the definition of the formal resource is parsed until a formal relationship is encountered. Continuing to block 318, the definition of this formal relationship is interpreted for each eligible resource identified above (starting from the first one). The operation is aimed at identifying the (eligible) concrete relationships that have the concrete resource as a source or target, as indicated in the definition of the formal relationship (irrespective of the other term of the formal relationship); for this purpose, the correlator extracts (from the resource repository) all the objects instantiating the class "RelationshipClass" that belong to the category of the formal relationship (indicated in the attribute "Category") and that have the attribute "Source" or "Target" equal to the identifier of the concrete resource (attribute "ID").

A test is then made at block 320 to determine whether the last eligible concrete resource (for the current formal resource) has been processed. If not, the flow of activity returns to block 318 for repeating the operations described above for a next eligible concrete resource. On the contrary, the method verifies at block 322 whether the parsing has been completed (i.e., all the formal relationships have been analyzed or the definition of the job does not include any formal relationship). If not, the flow of activity goes back to block 316 to reiterate the above-described steps for a next formal relationship.

On the contrary, the method descends into block 324. In this phase, the set of eligible concrete resources with their eligible concrete relationships, which has been obtained for each formal resource, is cleaned-up; particularly, the operation involves the removal of each eligible concrete resource for which no eligible concrete relationship has been found.

A loop is now performed for each eligible concrete relationship (starting from the first one); the loop begins at block 326, wherein the other concrete resource (associated with the corresponding eligible concrete resource in the eligible concrete relationship) is identified. The method then verifies at block 328 whether this concrete resource is available in the set of eligible concrete resources. If not, the eligible concrete relationship is removed from the set at block 330. A test is made at block 332 to determine the number of eligible concrete relationships that are still associated with the eligible concrete resource. If no eligible concrete relationship remains, the eligible concrete resource is removed as well at block 334. The flow of activity then descends into block 336. The same point is also reached directly from block 328 (when the other eligible concrete resource is available) or from block 332 (when one ore more eligible concrete relationships remain).

Considering now block 336, the correlator determines whether all the eligible concrete relationships have been processed. If not, the method returns to block 326 for repeating the same operations on a next eligible concrete relationship. Conversely, the exit condition of the above-described loop is verified at block 338. Particularly, if one or more eligible concrete relationships have been removed as a result of the execution of the loop the same operations are reiterated by returning to block 326. On the contrary, the flow of activity descends into block 339; in this phase, the set of eligible concrete resources is cleaned-up by removing any eligible concrete resource that is not specified as a source or target in any eligible concrete relationship. As a result, each formal resource is resolved into one or more concrete resources (possessing the desired properties and satisfying the desired formal relationships).

Proceeding to block 340, the information so obtained is returned to the executor. In response thereto, the executor at block 342 selects a single concrete resource for each formal resource (when more eligible concrete resources are available); for example, this operation is simply performed according to a random algorithm. The job can now be submitted at block 344 using the selected concrete resources.

The executor then verifies at block 346 whether all the jobs of the plan have been submitted. If not, the flow of activities returns to block 306 for repeating the operations described above on the jobs of the plan still to be submitted. Conversely, the execution of the branch ends at the stop circles 358.

At the same time, in the other branch 348-356 the executor is in a waiting condition at block 348. As soon as a generic job terminates, the executor at block 350 receives the corresponding feedback information (from the agent on which it has been submitted). Continuing to block 352, the feedback information is passed by the executor to the controller, and then logged into the workload database. Moreover, the controller at block 354 updates the estimated duration of the job in the workload database accordingly; for example, the estimated duration is calculated as a running average of the values that have been measured for the completed instances of the job (preferably filtering very different values as anomalies). A test is then made at block 356 to determine whether all the jobs of the plan have been terminated. If not, the flow of activities returns to block 348 waiting for the termination of a further job. Conversely, the execution of the branch ends at the stop circles 358.

For example, let us consider a system defined in the resource repository by the following objects instantiating the class "ResourceClass":
ID=R01
Type=Server
OS=OSa
ID=R02
Type=Server
OS=OSa
ID=R03
Type=Server
OS=OSb
ID=R04
Type=Client
Application=PCKa
ID=R05
Type=Client
Application=PCKa
ID=R06
Type=Client
Application=PCKa
ID=R07
Type=Client
Application=PCKb
ID=R08
Type=DataBase
Name=DBa
ID=R09
Type=DataBase
Name=DBa
ID=R10
Type=DataBase
Name=DBb
and by the following objects instantiating the class "RelationshipClass":
ID=S01
Category=Manages
Source=R01
Target=R04
ID=S02
Category=Manages
Source=R01
Target=R05
ID=S03
Category=Manages
Source=R02
Target=R06
ID=S04
Category=Manages
Source=R03
Target=R07
ID=S05
Category=Accesses
Source=R04
Target=R08
ID=S06
Category=Accesses
Source=R06
Target=R10
ID=S07
Category=Accesses
Source=R07
Target=R09
ID=S08
Category=Accesses
Source=R07
Target=R10

Figure 4:
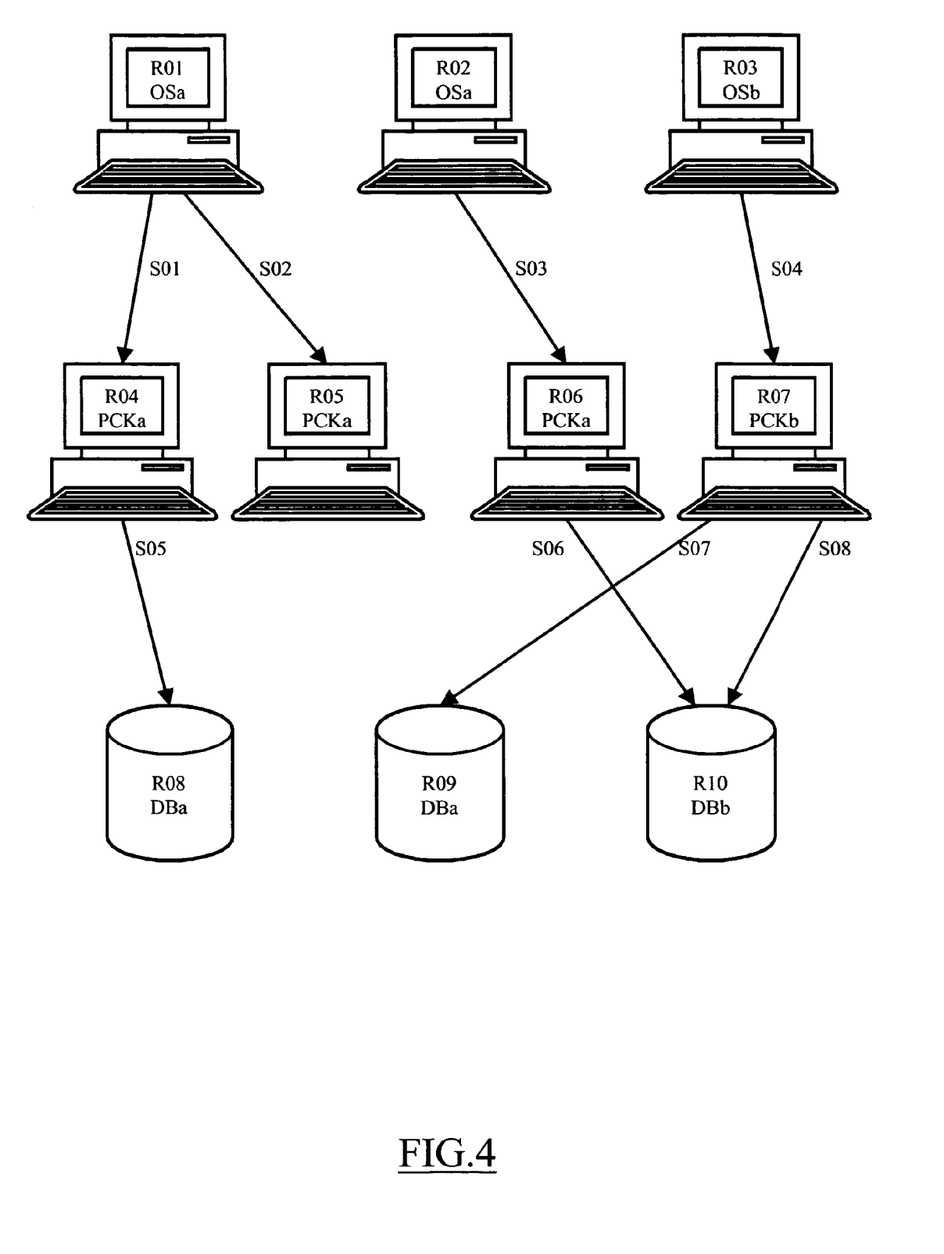
FIG. 4 depicts exemplary resources of the system with their relationships.

As shown in FIG. 4, the system at issue includes three server computers; two servers ("R01" and "R02") have the operating system "OSa" installed and one server ("R03") has the operating system "OSb" installed. The system also includes four client computers; three clients ("R04", "R05", and "R06") run the application "PCKa" and one client ("R07") runs the application "PCKb". Two instances of the database "DBa" ("R08" and "R09") and one instance of the database "DBb" ("R10") are available in the system. The server "R01" manages the clients "R04" ("S01") and "R05" ("S02"), the server "R02" manages the client "R06" ("s03"), and the server "R03" manages the client "R07" ("S04"). The client "R04" accesses the database "R08" ("S05"), the client "R06" accesses the database "R10" ("S06"), and the client "R07" accesses the databases "R09" ("S07") and "R10" ("S08"); the client "R05" does not access any database of the system.

An exemplary job to be executed on the system is defined by the following descriptor:

```
<?xml version="MyVersion" encoding="MyEncoding"?>
<jsdl:job name="MyJob" type="MyType">
  <execution>
    <executable path="MyPath"
      stdIn="MyIn" stdOut="MyOut" stdErr="MyErr"
      workingDirectory="MyDir">
      <arguments>
        <value>"MyArg1"</value>
        <value>"MyArg2"</value>
      </arguments>
      <environment inherit="yes">
        <variable name="MyVar1">"MyValue1"</variable>
        <variable name="MyVar2">"MyValue2"</variable>
      </environment>
    </executable>
  </execution>
  <resources>
    <resource label="MyServer" type="Server">
      <requirement>
        <All>
          <condition property="OS" sign="equal">
            "OSa"
          </condition>
          <relationship category="Manages" target="MyClient"
          />
        </All>
      </requirement>
    </resource>
    <resource label="MyClient" type="Client">
      <requirement>
        <All>
```

```
                <condition property="Application" sign="equal">
                    "PCKa"
                </condition>
                <relationship category="Accesses" target="MyDB"
                />
            </All>
        </requirement>
    </resource>
    <resource label="MyDB" type="DataBase">
        <requirement>
            <condition property="Name" sign="equal">
                "DBa"
            </condition >
        </requirement>
    </resource>
</resources>
</jsdl:job>
```

The descriptor starts with a header that identifies the control language (i.e., its version="Myversion" and encoding style "MyEncoding") and the job (i.e., its name "MyJob" and type "MyType"). The execution specification section (tag <execution>) defines the program to be invoked (i.e., its path "MyPath", standard input "MyIn", standard output "MyOut", standard error "MyErr" and working directory "MyDir"); the execution specification section also provides the arguments to be passed ("MyArg1", "MyArg2"), and the values ("MyValue1", "MyValue2") to be assigned to desired environmental variables ("MyVar1", "MyVar2"). On the other hand, the resource specification section (tag <resources>) defines the characteristics of each formal resource to be used by the job (tag <resource>). Particularly, the job "Myjob" requires a formal resource "MyServer" (of the type "Server"); the formal resource "MyServer" is identified by the property of having installed the operating system "OSa" and by the formal relationship of managing the formal resource "MyClient". Likewise, the formal resource "MyClient" (of the type "Client") must have installed the application "PCKa" (property), and must access the formal resource "MyDB" (relationship). At the end, the formal resource "MyDB" (of the type "DataBase") is defined by the property of having the name "DBa".

We now apply the above-described algorithm to the definition of the job. For each formal resource found in the descriptor ("MyServer", "MyClient" and "MyDB"), we identify the eligible concrete resources of the respective type and that possess the desired properties (disregarding any formal relationships):

"MyServer"—type=Server, "OS" equal "OSa":
  "R01", "R02"
"MyClient"—type=Client, "Application" equal "PCKa":
  "R04", "R05", "R06"
"MyDB"—type=DataBase, "Name" equal "DBa":
  "R08", "R09"

We consider now the formal resources that specify one or more formal relationships. For each corresponding eligible concrete resource found in the preceding step, the method now identifies the corresponding eligible concrete relationships; those eligible concrete relationships must belong to the specified category and must have the eligible concrete resource as the source (if the formal relationship defines the target) or as the target (otherwise):

"MyServer"—type="Manages", source
  "R01": "S01", "S02"
  "R02": "S03"
"MyClient"—type="Accesses", source
  "R04": "S05"
  "R05": –
  "R06": "S06"

The algorithm continues by removing the eligible concrete resources that do not satisfy any eligible concrete relationship (when applicable):

"MyServer"
  "R01" ("S01","S02"), "R02" ("S03")
"MyClient"
  "R04" ("S05"), "R06" ("S06")
"MyDB"
  "R08", "R09"

We now perform a first iteration of the reduction loop on the set of eligible concrete resources, with the object of removing the eligible concrete relationships which other eligible concrete resource (source or target) is not available (with each eligible concrete resource that is removed as well when no corresponding eligible concrete relationship remains):

"MyServer"
  "R01" ("S01") "R02" ("S03")
"MyClient"
  "R04" ("S05"),
"MyDB"
  "R08", "R09"

A next iteration of the same loop provides:

"MyServer"
  "R01" ("S01"),
"MyClient"
  "R04" ("S05")
"MyDB"
  "R08", "R09"

A further iteration of the loop does not cause any other removal; therefore, the process is completed by removing the eligible concrete resources that do not satisfy any eligible concrete relationship:

"MyServer"
  "R01" ("S01")
"MyClient"
  "R04" ("S05")
"MyDB"
  "R08";

The job can now be submitted on the server "R01" (having the operating system "OSa" installed). The server "R01" manages the client "R04" ("S01"). The client "R04" has the application "PCKa" installed and accesses the database "R08" ("S05").

Naturally, in order to satisfy local and specific requirements, a person skilled in the art may apply to the solution described above many modifications and alterations. Particularly, although the present invention has been described with a certain degree of particularity with reference to preferred embodiment(s) thereof, it should be understood that various omissions, substitutions and changes in the form and details as well as other embodiments are possible; moreover, it is expressly intended that specific elements and/or method steps described in connection with any disclosed embodiment of the invention may be incorporated in any other embodiment as a general matter of design choice.

For example, even though in the preceding description reference has been made to non-interactive jobs, this is not to be intended as a limitation; indeed, the method of the invention can be used to schedule the execution of any kind of work units (for example, interactive tasks). Similar considerations apply if the jobs require other resources implementing different relationships. Likewise, the jobs, the formal resources and/or the formal relationships can be defined with equivalent formalisms. Moreover, the proposed method applies to every job or to selected ones only, and to every resource or to some of them only.

Without departing from the principles of the invention, the concrete resources and their concrete relationships can be defined with a different model, or their definition can be stored in any equivalent memory structure.

Similar considerations apply if the concrete resources are of different types, or if the concrete relationships belong to other categories.

Alternatively, the program is structured in a different way, or additional modules or functions are provided; likewise, the different memory structures can be of different types, or can be replaced with equivalent entities (not necessarily consisting of physical storage media). Moreover, the proposed solution can implement an equivalent method (for example, with similar or additional steps).

In addition, it is possible to distribute the program in any other computer readable medium (such as a DVD).

Similar considerations apply if the proposed method is applied in a system having a different architecture or based on equivalent elements; likewise, each computer can have another structure or it can be replaced with any data processing entity (such as a PDA, a mobile phone, and the like).

Moreover, it will be apparent to those skilled in the art that the additional features providing further advantages are not essential for carrying out the invention, and may be omitted or replaced with different features.

For example, the configuration of the system (i.e., the properties of the concrete resources and their concrete relationships) can be detected at run-time.

In any case, simplified implementations without the definition of the types of the resources or that support a single category of relationships are within the scope of the invention.

Alternatively, it is possible to define more complex relationships (for example, with multiple sources and/or targets).

Moreover, the above-described algorithm for resolving the formal resources must not be interpreted in a limitative manner. Indeed, the invention can be put into practice with any other method (for example, inverting the steps of identifying the eligible concrete relationships and the eligible concrete resources).

Similar considerations apply if the programs are preloaded onto the hard disks, are sent to the computers through the network, are broadcast, or more generally are provided in any other form directly loadable into the working memories of the computers.

At the end, the method according to the present invention leads itself to be carried out with a hardware structure (for example, integrated in chips of semiconductor material), or with a combination of software and hardware.

The invention claimed is:

1. A method for scheduling execution of work units in a data processing system including a plurality of resources, a relationship being established among different resources in the plurality of resources, wherein for a work unit the method comprises:
   providing from a workload database, to an application executing in a scheduling server computer, a definition of the work unit, the definition of the work unit including an execution specification section and an indication of a formal resource required by the work unit, each formal resource indicating a property of the formal resource and a formal relationship with at least one other formal resource, a formal resource being a definition corresponding to a set of resources in the plurality of resources, wherein by specifying the formal resource, the formal resource to resolve to any suitable resource in the corresponding set of resources, wherein the formal relationship belongs to one of a plurality of predefined categories of relationships between resources, the definition of the work unit including an indication of the category to which the formal relationship belongs;
   resolving the formal resource into a resource from the corresponding set of resources such that the resource possesses the property and satisfies the formal relationship indicated in the formal resource; and
   submitting, over a data network, the work unit on the resource corresponding to the formal resource.

2. The method according to claim 1, wherein the resolving the formal resource includes:
   accessing a predefined memory structure, for each resource from the corresponding set of resources the memory structure storing an indication of the property possessed by the resource, and for each formal relationship the memory structure storing an indication of a subset of the corresponding set of resources satisfying the formal relationship.

3. The method according to claim 1, wherein the property of the resource includes one of a plurality of predefined types of resources.

4. The method according to claim 1, wherein the formal relationship is a relationship established between a source resource and a target resource, the source and target resources being resources in the plurality of resources.

5. The method according to claim 1, wherein the resolving the formal resource includes:
   identifying a set of eligible resources such that each resource to be included in the set of eligible resources from the plurality of resources possesses the property; and
   reducing the set of eligible resources according to the formal relationship, wherein the reducing includes:
   identifying, for each resource in the set of eligible resources, an eligible relationship belonging to the same category as the corresponding formal relationship;
   removing from consideration each such eligible relationship which is not satisfied by the reduced set of eligible resources;
   removing from consideration each such resource in the reduced set of eligible resources which is no longer associated with at least one remaining eligible relationship; and
   reiterating the removing from consideration steps until no more eligible relationships can be removed from consideration.

6. A computer program product in computer readable storage medium, such that when the computer program product is loaded into a working memory of a data processing system (system), the system performs a method for scheduling execution of work units, wherein the system includes a plurality of resources, a relationship being established among different resources in the plurality of resources, and wherein for a work unit the method comprises:
   providing from a workload database, to an application executing in a scheduling server computer, a definition of the work unit, the definition of the work unit including an execution specification section and an indication of a formal resource required by the work unit, each formal resource indicating a property of the formal resource and a formal relationship with at least one other formal resource, a formal resource being a definition corresponding to a set of resources in the plurality of resources, wherein by specifying the formal resource, the formal resource to resolve to any suitable resource in the corresponding set of resources, wherein the formal relationship belongs to one of a plurality of predefined categories of relationships between resources, the definition of the work unit including an indication of the category to which the formal relationship belongs;

resolving the formal resource into a resource from the corresponding set of resources such that the resource possesses the property and satisfies the formal relationship indicated in the formal resource; and submitting, over a data network, the work unit on the resource corresponding to the formal resource, the submitting causing the work unit to execute using the resource.

7. The computer program product according to claim 6, wherein the resolving the formal resource includes:

accessing a predefined memory structure, for each resource from the corresponding set of resources the memory structure storing an indication of the property possessed by the resource, and for each formal relationship the memory structure storing an indication of a subset of the corresponding set of resources satisfying the formal relationship.

8. The computer program product according to claim 6, wherein the property of the resource includes one of a plurality of predefined types of resources.

9. The computer program product according to claim 6, wherein the formal relationship is a relationship established between a source resource and a target resource, the source and target resources being resources in the plurality of resources.

10. The computer program product according to claim 6, wherein the resolving the formal resource includes:

identifying a set of eligible resources such that each resource to be included in the set of eligible resources from the plurality of resources possesses the property; and reducing the set of eligible resources according to the formal relationship, wherein the reducing includes:

identifying, for each resource in the set of eligible resources, an eligible relationship belonging to the same category as the corresponding formal relationship;

removing from consideration each such eligible relationship which is not satisfied by the reduced set of eligible resources;

removing from consideration each such resource in the reduced set of eligible resources which is no longer associated with at least one remaining eligible relationship; and reiterating the removing from consideration steps until no more eligible relationships can be removed from consideration.

11. A data processing system including a plurality of resources, a relationship being established among different resources in the plurality of resources, the data processing system comprising:

a storage device including a storage medium, wherein the storage device stores computer usable program code; and a processor, wherein the processor executes the computer usable program code, and wherein the computer usable program code comprises:

computer usable code for scheduling execution of a work unit, wherein the computer usable code for scheduling includes:

computer usable code for providing from a workload database, to an application executing in a scheduling server computer, a definition of the work unit, wherein the definition of the work unit includes an execution specification section and an indication of a formal resource required by the work unit, each formal resource indicating a property of the formal resource and a formal relationship with at least one other formal resource, a formal resource being a definition corresponding to a set of resources in the plurality of resources, wherein by specifying the formal resource, the formal resource to resolve to any suitable resource in the corresponding set of resources, wherein the formal relationship belongs to one of a plurality of predefined categories of relationships between resources, the definition of the work unit including an indication of the category to which the formal relationship belongs;

computer usable code for resolving the formal resource into a resource from the corresponding set of resources such that the resource possesses the property and satisfies the formal relationship indicated in the formal resource; and computer usable code for submitting, over a data network, each work unit on the resource corresponding to the formal resource.

* * * * *